(12) United States Patent
Nissing

(10) Patent No.: US 12,190,395 B2
(45) Date of Patent: Jan. 7, 2025

(54) HIGHLY RESPONSIVE FARMING SYSTEMS WITH EXTRAORDINARY IN-SEASON OPTIMIZATION

(71) Applicant: Climate LLC, St. Louis, MO (US)

(72) Inventor: Nick Nissing, St. Charles, MO (US)

(73) Assignee: CLIMATE LLC, St. Louis, MO (US)

( * ) Notice: Subject to any disclaimer, the term of this patent is extended or adjusted under 35 U.S.C. 154(b) by 0 days.

(21) Appl. No.: 18/420,289

(22) Filed: Jan. 23, 2024

(65) Prior Publication Data

US 2024/0161209 A1   May 16, 2024

Related U.S. Application Data

(63) Continuation of application No. 17/118,384, filed on Dec. 10, 2020, now Pat. No. 11,908,025.

(60) Provisional application No. 62/946,806, filed on Dec. 11, 2019.

(51) Int. Cl.
| | |
|---|---|
| G06Q 50/02 | (2024.01) |
| A01B 79/00 | (2006.01) |
| A01B 79/02 | (2006.01) |
| G06N 20/00 | (2019.01) |
| G06V 20/10 | (2022.01) |
| B64U 101/30 | (2023.01) |
| G06V 20/13 | (2022.01) |

(52) U.S. Cl.
CPC ........... *G06Q 50/02* (2013.01); *A01B 79/005* (2013.01); *A01B 79/02* (2013.01); *G06N 20/00* (2019.01); *G06V 20/188* (2022.01); *B64U 2101/30* (2023.01); *B64U 2201/10* (2023.01); *G06V 20/13* (2022.01); *G06V 20/194* (2022.01)

(58) Field of Classification Search
CPC ...... G06Q 50/02; A01B 79/005; A01B 79/02; A01B 69/001; G06N 20/00; G06N 3/006; G06N 3/126; G06N 5/01; G06V 20/188; G06V 20/13; G06V 20/194; B64U 2101/30; B64U 2201/10; B64D 1/18
See application file for complete search history.

(56) References Cited

U.S. PATENT DOCUMENTS

| | | |
|---|---|---|
| 9,489,576 B2 | 11/2016 | Johnson et al. |
| 10,390,472 B2 | 8/2019 | Matthews |
| 10,524,409 B2 | 1/2020 | Posselius et al. |
| 11,079,725 B2 | 8/2021 | Palla et al. |
| 11,357,153 B2 | 6/2022 | Foster et al. |

(Continued)

FOREIGN PATENT DOCUMENTS

| | | |
|---|---|---|
| CN | 105197243 A | 12/2015 |
| JP | 2018169995 A | 11/2018 |

(Continued)

*Primary Examiner* — Richard M Camby
(74) *Attorney, Agent, or Firm* — Michael VanEngelen

(57) ABSTRACT

A method for controlling application of agrichemical products, comprises acquiring remotely sensed digital image data; developing a prescription to apply at least one agrichemical product in a variable manner based on at least the digital image data, wherein the prescription describes a plurality of passes of a particular autonomous vehicle over a field to apply the at least one agrichemical product; applying the at least one agrichemical product to a crop in the variable manner by the particular autonomous vehicle according to the prescription.

20 Claims, 10 Drawing Sheets

800

(56) References Cited

U.S. PATENT DOCUMENTS

| | | |
|---|---|---|
| 11,467,605 B2 | 10/2022 | Palla et al. |
| 2009/0007485 A1 | 1/2009 | Holland |
| 2015/0302305 A1 | 10/2015 | Rupp et al. |
| 2015/0310633 A1 | 10/2015 | Nelan |
| 2015/0310721 A1 | 10/2015 | Johnson |
| 2016/0270289 A1 | 9/2016 | Schildroth et al. |
| 2016/0307448 A1 | 10/2016 | Salnikov et al. |
| 2018/0035605 A1 | 2/2018 | Guan et al. |
| 2018/0158179 A1 | 6/2018 | Sauder et al. |
| 2019/0377945 A1 | 12/2019 | Sugaya |
| 2020/0045898 A1* | 2/2020 | Arriaza .................. G06F 30/27 |
| 2020/0184214 A1 | 6/2020 | Casas et al. |
| 2020/0193589 A1 | 6/2020 | Peshlov et al. |
| 2020/0201269 A1* | 6/2020 | Johannesson ........ A01B 79/005 |
| 2020/0364187 A1* | 11/2020 | Tran ......................... G06N 3/02 |
| 2020/0364456 A1* | 11/2020 | Tran ....................... G06Q 50/02 |

FOREIGN PATENT DOCUMENTS

| | | |
|---|---|---|
| WO | 2018158822 A1 | 9/2018 |
| WO | 2019075179 A1 | 4/2019 |

\* cited by examiner

Fig. 2
(a)
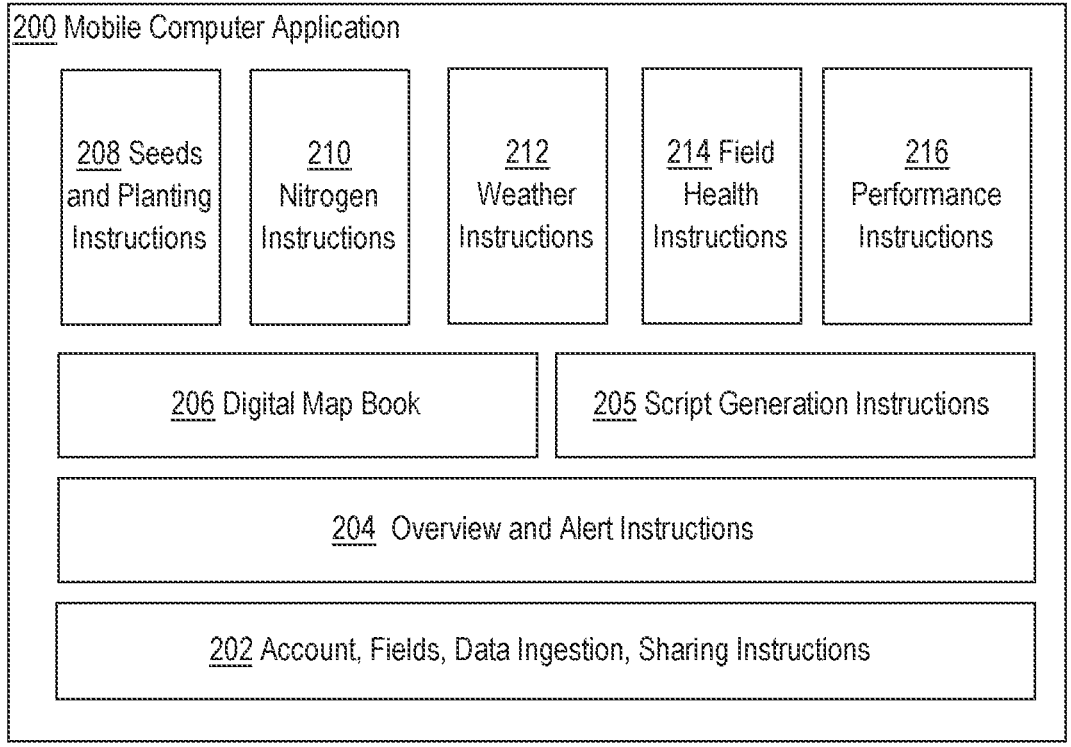
(b)
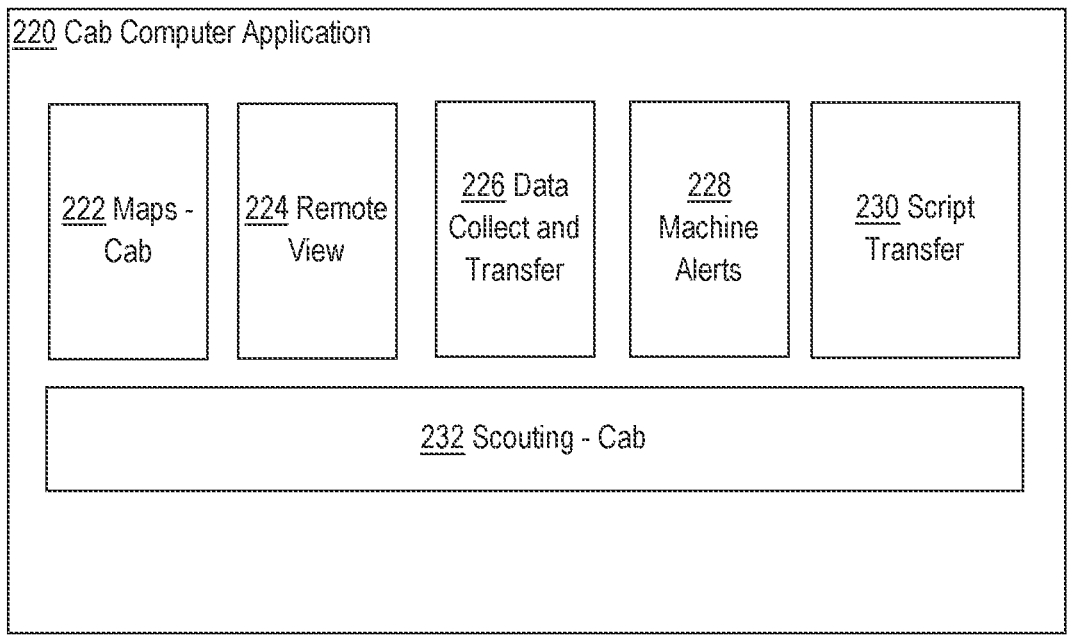

Data Manager

| | Nitrogen | Planting | Practices | Soil | |
|---|---|---|---|---|---|
| Planting 1(4 Fields)<br>Crop Corn Product<br>Plant Date: 2016-04-12<br>ILU 112 \| Pop: 34000<br>[Edit] [Apply] | Planting 2(0 Fields)<br>Crop Corn Product<br>Plant Date: 2016-04-15<br>ILU 83 \| Pop: 34000<br>[Edit] [Apply] | Planting 3(0 Fields)<br>Crop Corn Product<br>Plant Date: 2016-04-13<br>ILU 83 \| Pop: 34000<br>[Edit] [Apply] | Planting 4(1 Fields)<br>Crop Corn Product<br>Plant Date: 2016-04-13<br>ILU 112 \| Pop: 34000<br>[Edit] [Apply] | + Add New Planting Plan |

| | | CROP | PLANTED ACRES | PRODUCT | RELATIVE MATURITY | TARGET YIELD | POPULATION(AVG) | PLA |
|---|---|---|---|---|---|---|---|---|
| ☐ Select All | | | | | | | | |
| ☐ | Ames, IA 1<br>Corn \| 100 \| Boone, IA | Corn | — | DMC82-M | 112 | 160 | 34000 | Apr |
| ☐ | Austin, MN 1<br>Corn \| 100 \| Fredricks, MN | Corn | — | DMC82-M | 114 | 160 | 36000 | Apr |
| ☐ | Boone, IN 1<br>Corn \| 100 \| Boone, IA | Corn | — | DMC82-M | 112 | 150 | 34000 | Apr |
| ☐ | Champaign 1<br>Corn \| 100 \| Champaign, IL | Corn | — | — | 112 | 200 | 34000 | Apr |
| ☐ | E Nebraska 1<br>Corn \| 100 \| Burt, NE | Corn | — | — | 112 | 160 | 34000 | Apr |

FIG. 6

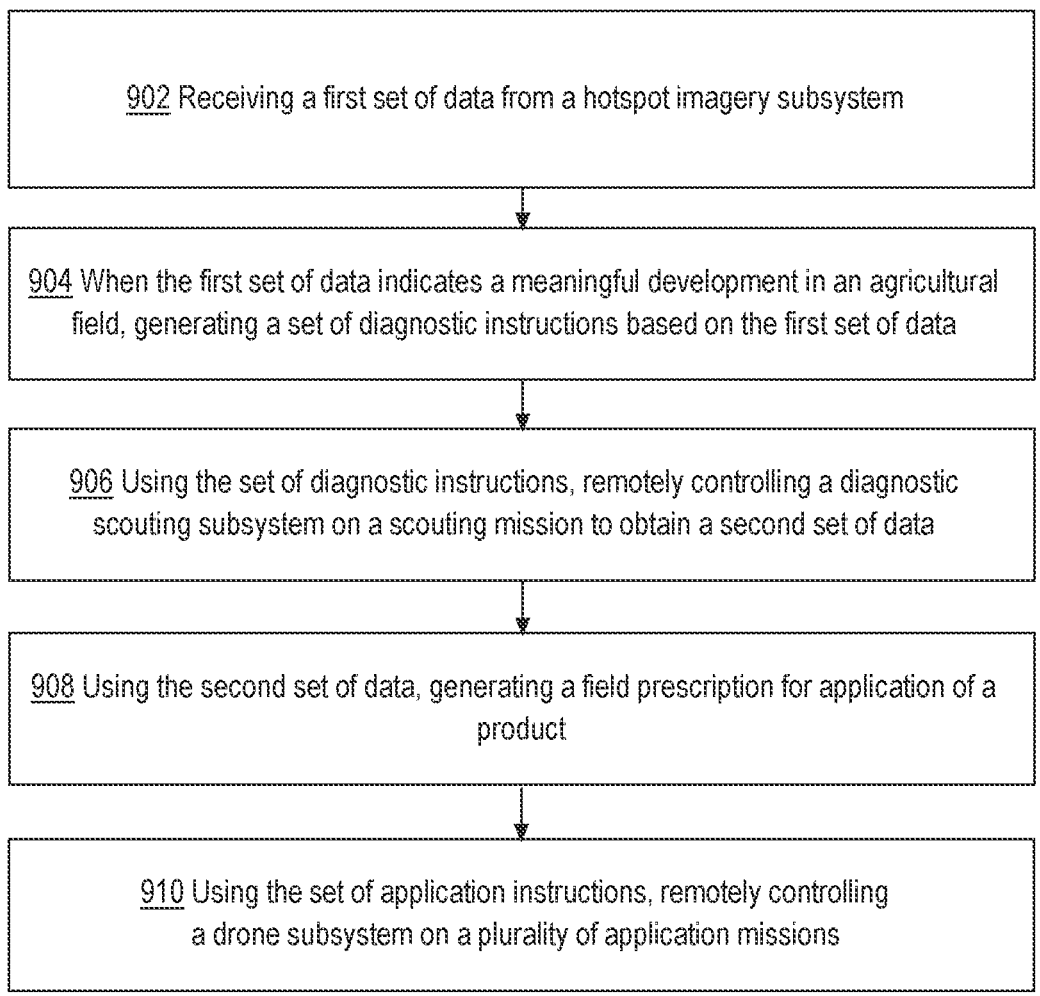

HIGHLY RESPONSIVE FARMING SYSTEMS WITH EXTRAORDINARY IN-SEASON OPTIMIZATION

BENEFIT CLAIM

This application claims the benefit of Provisional Application 62/946,806, filed Dec. 11, 2019, the entire contents of which is hereby incorporated by reference as if fully set forth herein, under 35 U.S.C. § 119(e).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2020 The Climate Corporation.

FIELD OF THE DISCLOSURE

One technical field of the present disclosure is drone-based management. Another technical field of the present disclosure is farming prescriptions.

BACKGROUND

Heavy ground farming implements can cause soil compaction and damage to crops each time an implement traverses a field, resulting in more harm than good. As such, traditional farming practices limit the number of passes in the field, between planting and harvesting, for applying agrichemicals because of the damage each traversal causes and the monetary loss associated with the damage. There are other limitations to ground farming implements. For example, ground farming implements may be required to traverse most of the field even though agrichemicals are only being applied to a particular area in the field. However, at times, the ground farming implements may not even be able to get out onto the field because of wet soil as these implements may become stuck. In addition, the ground farming implements require operators be available to man the implements. Limiting the number of passes on the field for applying needed agrichemicals during the season limits optimal crop yield.

Thus, there is a need for a more efficient, sustainable, and economical manner in traversing a field where the number of times in the field is not a limiting factor.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 9 illustrates an example method of generating a prescription for reapplication, in accordance with some embodiments.

DETAILED DESCRIPTION

Figure 1:
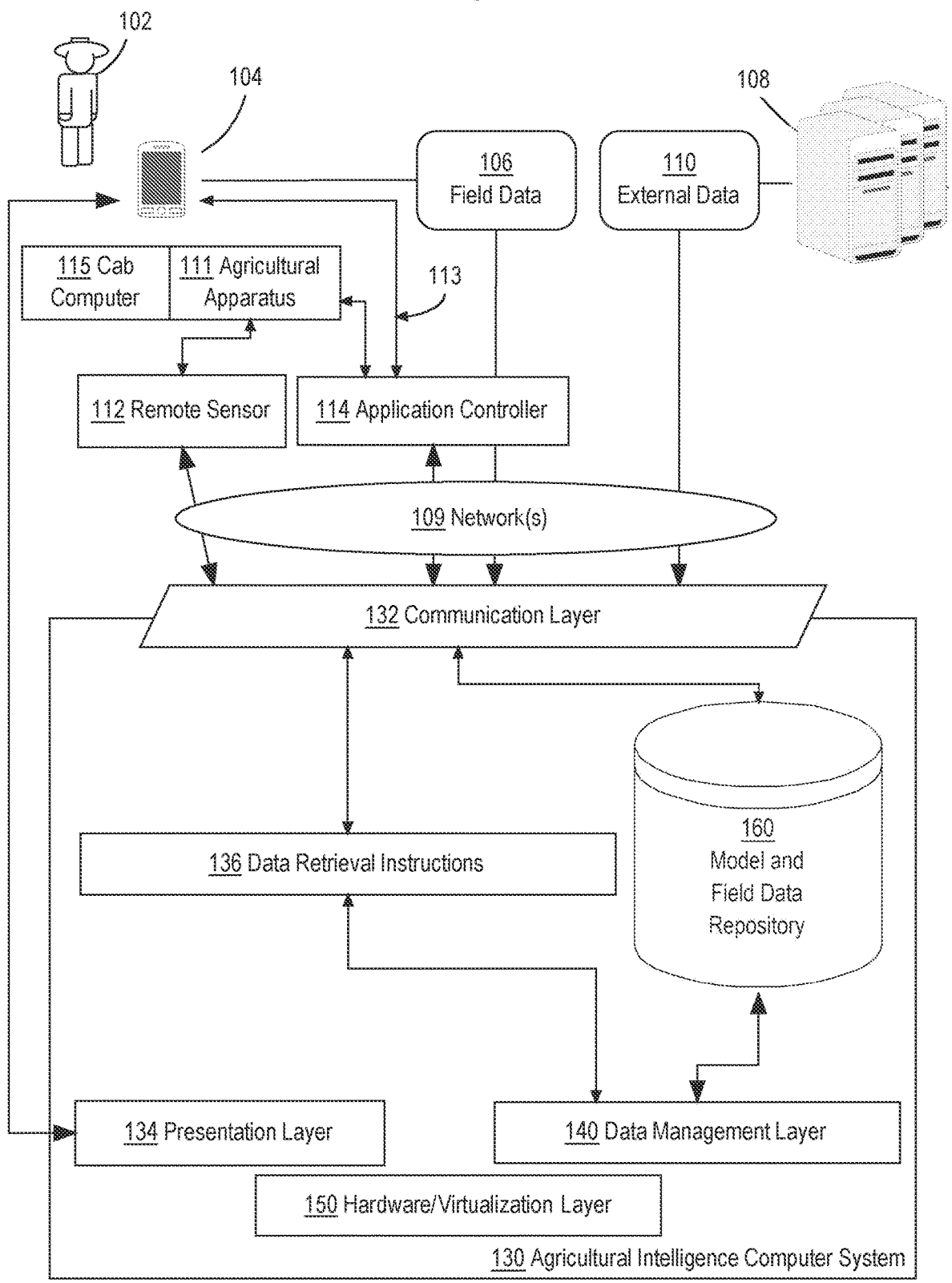
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. EXAMPLE DRONE-BASED MULTI-PASS AGRONOMIC SYSTEM
   3.1 MULTI-LEVEL COORDINATION SYSTEM
   3.2 DATA COLLECTION
   3.3 PRESCRIPTIONS
   3.4 REAPPLICATION OPTION
   3.5 MULTI-STORAGE CARTRIDGE CARRYING DRONE
   3.6 CROP PROTECTION WITH MULTIPLE PASSES
      3.6.1. HERBICIDE EXAMPLE
      3.6.2 INSECTICIDE EXAMPLE
      3.6.3 FUNGICIDE EXAMPLE
      3.6.4 FERTILITY EXAMPLE
      3.6.5 MICROBIALS EXAMPLE
      3.6.6 COVER CROPS EXAMPLE
      3.6.7 PGR EXAMPLE
   3.7 PROCEDURAL OVERVIEW
4. OTHER ASPECTS OF DISCLOSURE

1 General Overview

A drone-based multi-pass agronomic system shifts from traditional farming practices to a different, new paradigm, where the number of passes across a field, between planting operations and harvesting operations, is not a limiting factor. The system uses scouting drones to investigate problems in the field and application drones to apply agrichemicals at any time and as frequently as required during the season. Unlike ground implements, the scouting drones and application drones do not cause soil compaction and crop damage. The use of scouting drones and application drones allow for generation of environmentally responsive prescriptions throughout the season with to increase yields while decreasing the environmental impact and improving sustainability.

In one aspect, a computer-implemented method of generating a prescription for reapplication, comprising receiving a first set of data from a hotspot imagery subsystem. The method further comprises when the first set of data indicates a meaningful development in an agricultural field, generating a set of diagnostic instructions based on the first set of data. The method further comprises using the set of diagnostic instructions and remotely controlling a diagnostic scouting subsystem on a scouting mission to obtain a second set of data, wherein the second set of data are of diagnostic resolution. The method further comprises using the second set of data and generating a field prescription for application of a product, wherein the field prescription is associated with a set of application instructions. The method further comprises using the set of application instructions, and remotely controlling a drone subsystem on a plurality of application missions, wherein during each application mission, the drone subsystem is remotely controlled to pass over a portion of an agricultural field and to apply agrichemicals to the portion of the agricultural field according to the field prescription. The steps are performed by one or more computing devices.

Other features, aspects and embodiments will become apparent from the disclosure as a whole including the drawings and claims.

2 Example Agricultural Intelligence Computer System

2.1 Structural Overview

FIG. 1 illustrates an example computer system that is configured to perform the functions described herein, shown in a field environment with other apparatus with which the system may interoperate. In one embodiment, a user 102 owns, operates, or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, California, is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data, respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
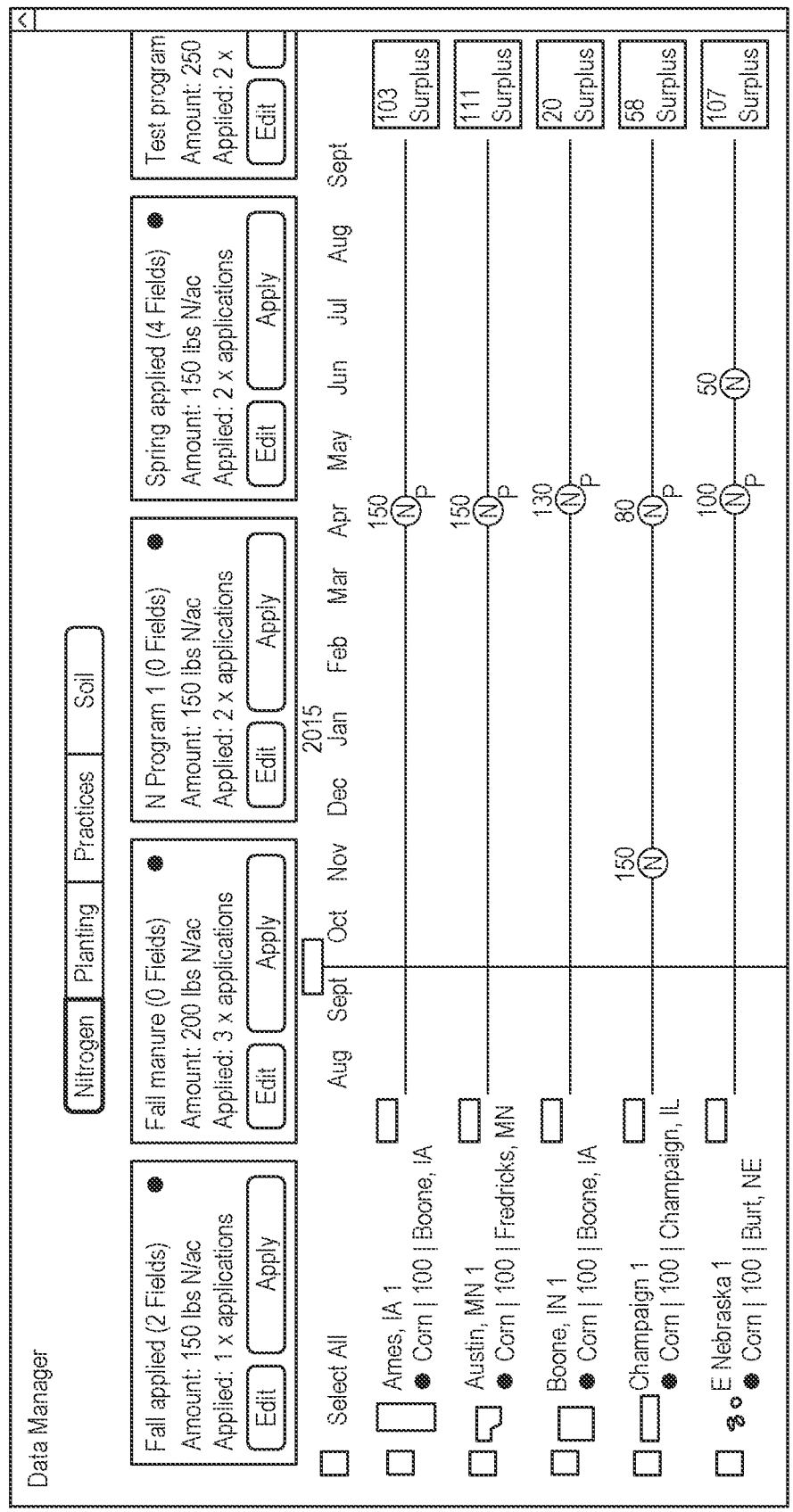
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, data retrieval instructions 136 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, the data retrieval instructions 136 may comprise a set of pages in RAM that contain instructions which when executed cause performing obtaining data from a hotspot imagery subsystem 706, a diagnostic scouting subsystem 708, a ground station 710, a ground subsystem 712, and/or a drone subsystem 714, as further described herein, for further analysis. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, the data retrieval instructions 136 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
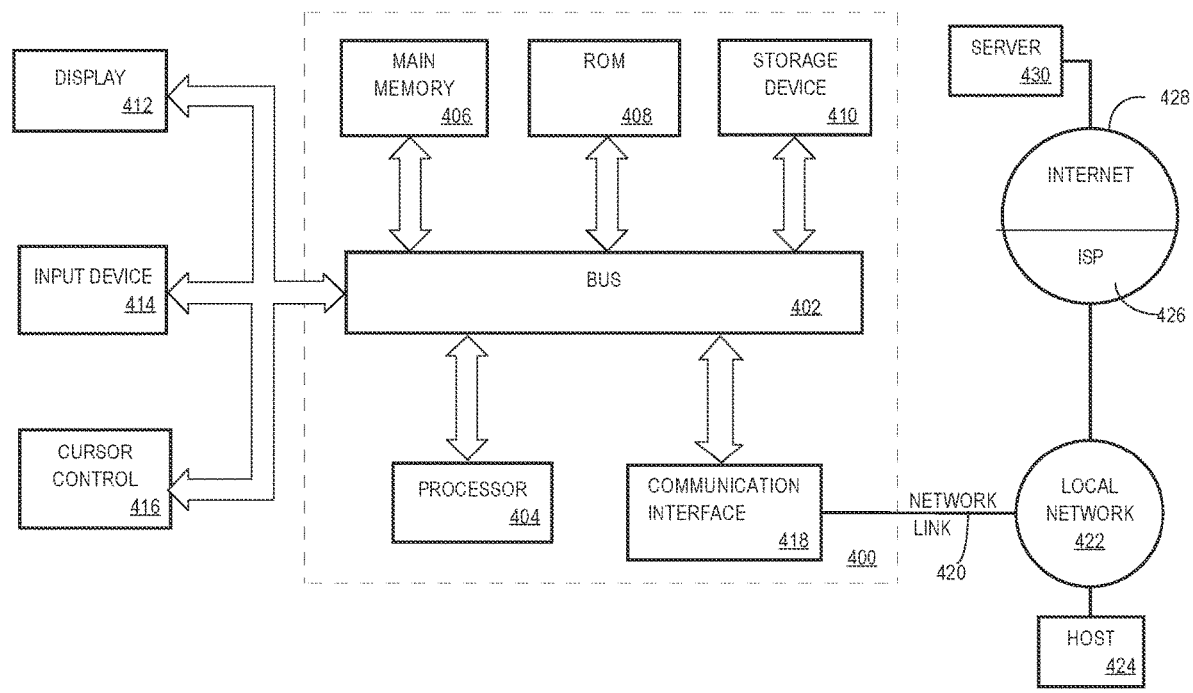
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2 Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly, or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights, and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3 Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage, and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
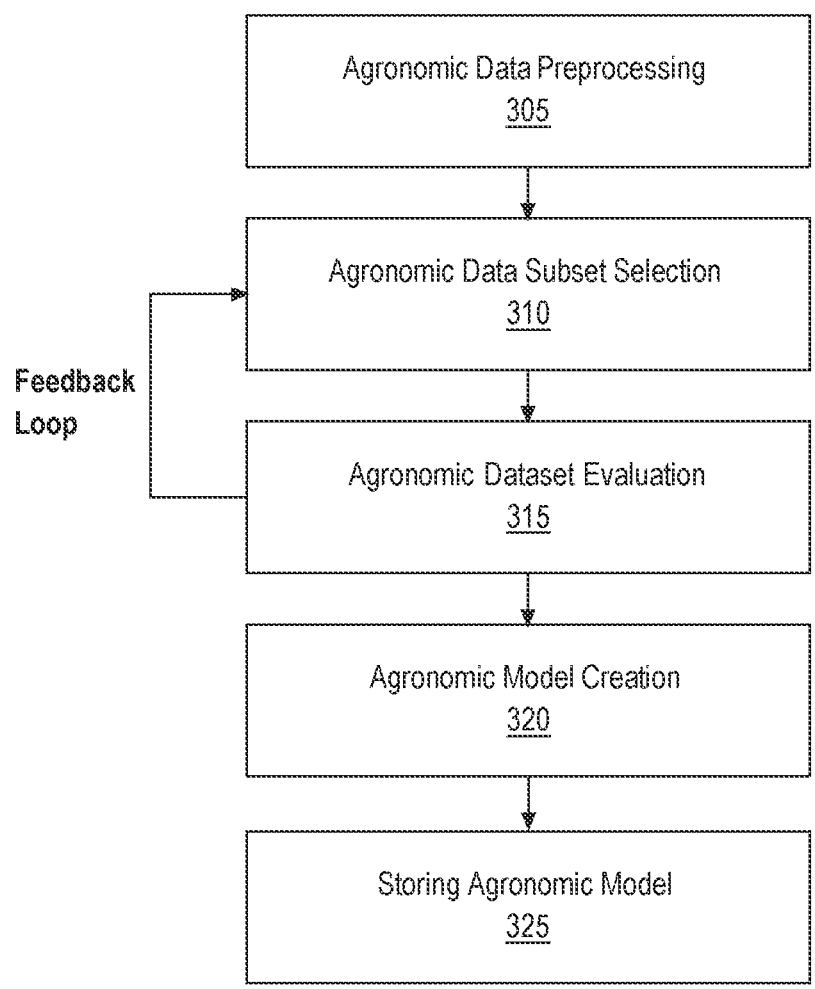
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3 Example Drone-Based Multi-Pass Agronomic System

Figure 7:
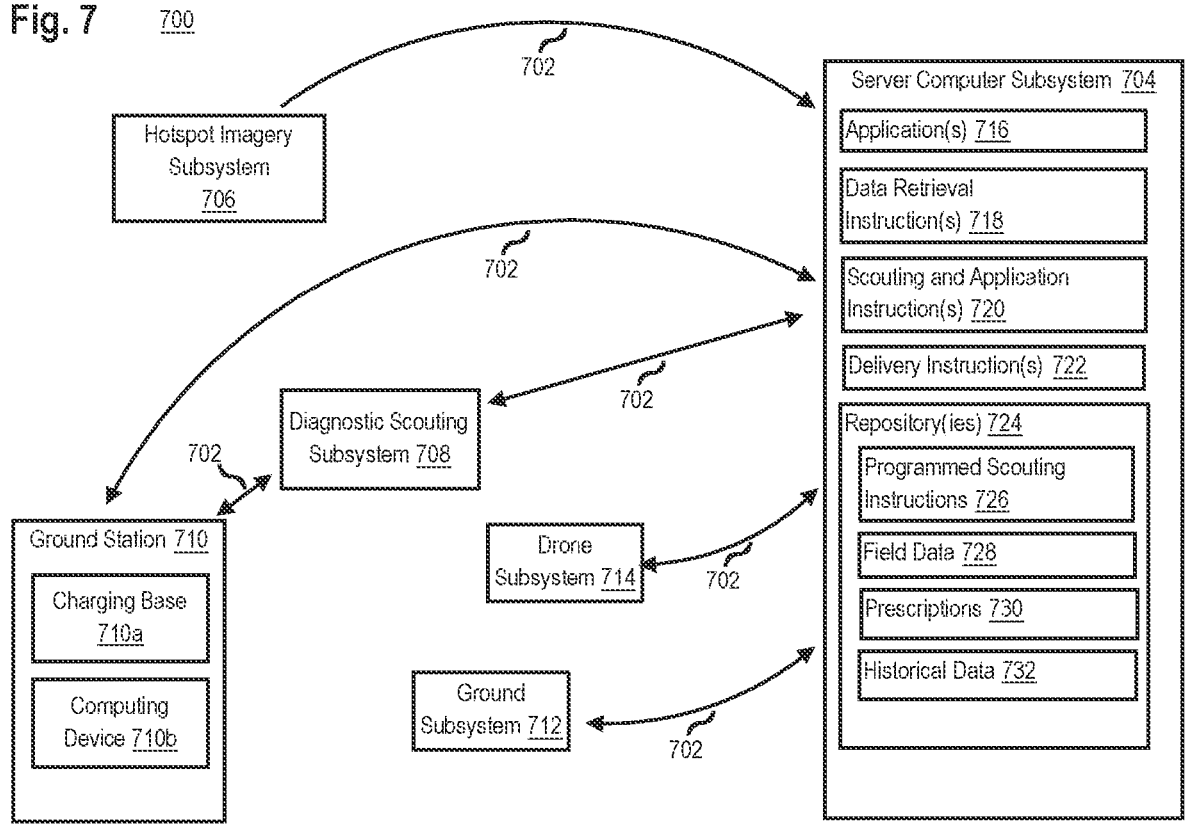
FIG. 7 illustrates an example drone-based management and agronomic system, in accordance with some embodiments.

FIG. 7 illustrates an example drone-based multi-pass agronomic system, in accordance with some embodiments. The drone-based multi-pass agronomic system 700 includes a server computer subsystem 704, a hotspot imagery subsystem 706, a diagnostic scouting subsystem 708, a ground station 710, a ground subsystem 712, and a drone subsystem 714, all of which are communicatively coupled via one or more network(s) 702 including a wireline network(s), a wireless network(s), or a combination thereof. A wireline network may comprise one or more local area networks, wide area networks, internetworks, or internets. A wireless network may comprise one or more radiofrequency, microwave, satellite links. In an embodiment, the server computing subsystem 704 may comprise the agricultural intelligence computer system 130 of FIG. 1.

The hotspot imagery subsystem 706 may comprise a satellite or a high altitude drone to take low resolution images of an agricultural field. The server computer subsystem 704 may receive raw data, such as low resolution images, from the hotspot imagery subsystem 706 on a weekly basis, or some other increment of time, for storage and further processing. Low resolution images may provide general characteristics/assessment of the field. For example, the low resolution images may indicate that a problem(s) or a meaningful development(s) exists in the field.

The diagnostic scouting subsystem 708 comprises a scouting drone(s) for investigating and reassessing problems in the field. The scouting drone may be a multi-altitude drone and is typically equipped with an imaging system and sensors to collect field-level data. Example field-level data includes high resolution images of a specific target(s), such as a particular plant, in the field.

The scouting drone may deploy from and return to the self-contained ground station 710 after a scouting mission. The ground station 710 is located on the field and provides shelter for one or more scouting drones. The ground station 710 may include a charging base 710a and a computing device 710b. When the scouting drone is not on a scouting mission, it may be charged using the charging base 710a.

The scouting drone may receive programmed scouting instructions prior to a scouting mission from the server computer subsystem 704, the ground station 710, or both. Example instructions may control the scouting drone to take images of a certain target, such as a crop, in the field, at a certain time, and on a certain day. Images are of diagnostic resolution to provide the current state of targets for investigating and reassessing problems. For example, high resolution images may show a start of an insecticide problem with corn crops. For another example, high resolution images may show that a micronutrient problem with soybean crops has improved since the previous treatment application.

The scouting drone may transmit raw data, such as high resolution images, multispectral images, hyperspectral images, thermal images, and/or LIDAR, in or near real-time or after the scouting mission, to the computing device 710b for local/edge processing, to the server computer subsystem 704 for storage and further processing, or both.

The computing device 710b may receive from and transmit data to the server computer subsystem 704 and the scouting drone. For example, the computing device 710b may receive programmed scouting instructions from the server computer subsystem 704 for uploading to the scouting drone 708. For another example, the computing device 710b may transmit raw data collected by the scouting drone and/or locally processed data to the server computer subsystem 704 for storage and further processing. The computing device 710b may also allow an operator to conduct health checks of the scouting drone 708 and to generate, modify and upload programmed scouting instructions for controlling the scouting drone 708 prior to a scouting mission. In an embodiment, the scouting drone 708 and the ground station 710, together, are referred to as a "drone in a box."

The ground subsystem 712 and the drone subsystem 714 may assist in field operations. The ground subsystem 712 may comprise one or more ground implements, such as a planting unit, a tillage unit, a harvesting unit, a soil testing unit, a base fertility unit, and a land application unit, that are on the ground in the field. The drone subsystem 714 may comprise one or more application drones.

A land application unit and an application drone are for applying treatments in a field during application missions, and may carry a plurality of payload storage cartridges, each of the payload storage cartridges containing one or more agrichemicals. The land application unit and the application drone may traverse the field, either physically on or flying above the ground, and apply the agrichemicals during traversal, according to programmed application instructions received prior to an application mission from the server computing subsystem 704.

Each of the ground subsystem 712 and the drone subsystem 714 may also collect and provide raw data to the server computing subsystem 704, in or near real time or after the application mission, for storage and further processing.

The server computing subsystem 704 may comprise one or more cores, processors, computers, and/or virtual machine instances hosted at off field at a management location of the field, or using a public or private cloud computing facility.

The server computing subsystem 704 hosts or executes one or more applications 716 to assist an operator(s) in agricultural operations. For example, the operator may use the one or more applications 716 to access the diagnostic scouting subsystem 708, the ground station 710, the ground subsystem 712, and the drone subsystem 714.

The server computing subsystem 704 may be coupled to a data repository(ies) 724 that is configured for storing programmed scouting instructions 726, field data 728, prescriptions and corresponding programmed application instructions 730, and historical data 732. Other information, such as weather data, field maps, and biomass/yield, may also be stored in the data repository 724.

The server computing subsystem 704 may be programmed with data retrieval instructions 718, scouting and application instructions 720, and delivery instructions 722. Other sets of instructions may be included to form a complete system such as an operating system, utility libraries, a presentation layer, database interface layer and so forth.

In an embodiment, the data retrieval instructions 718 are programmed for retrieving raw and processed data from one or more of the subsystems 706, 708, 712, 714 and the ground station 710. For example, the data retrieval instructions 718 may be programmed for retrieving raw images from the hotspot imagery subsystem 706 and the diagnostic scouting subsystem 708. For another example, the data retrieval instructions 718 may be programmed for retrieving locally processed data from the ground station 710. In an embodiment, the data retrieval instructions 718 are also programmed for retrieving data from other external sources. For example, the data retrieval instructions 718 may be programmed for retrieving weather data from an external weather forecasting source.

In an embodiment, the scouting and application instructions 720 are programmed for analyzing various data (such as field data, imagery, efficacy estimate, biomass/yield, economic impact, subjective aggressiveness, historical data, weed species detection, pest species detection, weed size, crop maturity, population density, reapplication options, active ingredient modes of action) and, based on the analysis, generating programmed scouting instructions and prescriptions and corresponding programmed application instructions. Prescriptions may be zone-based, allowing for more precise farming as each prescription describes a specific treatment for a zone of the field. Zones may be relatively large contiguous portions of the fields, such as 25-50% of the field, or may be smaller contiguous regions that are 1-10% of the field, or may be even micro-zones that less than 1% of the field, including treatments intended for a single-plant zone. The server computing subsystem 704 uses programmed scouting instructions to control scouting drones during scouting missions and uses programmed application instructions to control land application units and application drones during application missions.

In an embodiment, the delivery instructions 722 are programmed for delivering programmed application instructions to the ground and drone subsystems 712, 714 and for delivering programmed scouting instructions to the diagnostic scouting subsystem 708 or to the ground station 710.

In an embodiment, an application drone is larger in size and weight than a scouting drone, because the application drone comprises multiple payload storage cartridges carrying different payloads that are applied above crops, whereas the scouting drone does not and, in some embodiments, needs to be small enough fly under crop canopies. Each of the drones described herein includes a storage device for storing data, such as programmed instructions, and a networking interface for communicating with a host computer for receiving the programmed instructions and sending collected data. An example application drone is a multi-storage cartridge carrying drone is discussed in Section 3.5.

Although FIG. 7 illustrates the scouting drone as separate and distinct from the application drone, the scouting drone and the application drone may be one of the same drone according to an embodiment. For example, an application drone may also comprise sensors enabling scouting functions (e.g., imagery collection) as a matter of economic efficiency through incorporating multiple functions in a single device. In some embodiments, a drone equipment with both scouting capabilities and application capabilities may be used to identify a target and apply a prescribed payload in the same flight (for example, by identifying weeds and spraying in the same flight, or by identifying nutrient stress and applying the appropriate nutrient in the same flight).

The server computing subsystem 704 operates with the elements 706, 708, 710, 712, and/or 714 of the system 700 to provide analytics and generate specific or targeted prescriptions for precision agriculture.

3.1 Multi-Level Coordination System

A multi-level coordination system may involve sensors from multiple platforms, such as those subsystems illustrated in FIG. 7. Example sensors include satellite-based sensors, drone-based sensors, ground-based robots, implement-based equipment sensors, handheld sensors, or even fixed sensors (e.g., such as moisture sensors, or stationary cameras). Satellite-based imagery may be used for their consistency and low cost but suffer from limitations related to resolution, atmospheric distortion, and cloud cover. Drone-based imagery may be used for their greater flexibility in timing, sensor types, and higher resolution but is much more expensive to collect and suffers from inconsistencies. Sensors from multiple platforms may be used to optimize the performance of the entire system though data collection, analysis, recommendations, and application.

In an embodiment, programmed scouting instructions may be generated at the server computer subsystem 704 or at the ground station 710. Programmed scouting instructions may be generated in response to a "tip" provided by the hotspot imagery subsystem 706 to "cue" an investigation. When data collected by the hotspot imagery subsystem 706 identifies a problem in the field, programmed scouting instructions may be generated to collect data, using a scouting drone, for investigation. For example, when low resolution images of the field taken by the hotspot imagery subsystem 706 identify a problem with corn crops, the scouting drone is controlled, under programmed scouting instructions, to fly under the corn canopy and to collect data of the corn crops. Alternatively, or in addition to, a ground-based robotic system may be directed to collect data underneath the canopy of the crop. In an embodiment, the data collected by the hotspot imagery subsystem 706 includes multi-spectral images at a first resolution, the data collected by the diagnostic scouting subsystem 708 includes multi-spectral images at a second resolution, and the data collected by the ground-based robotic system includes multispectral images at a third resolution. The first resolution may comprise a ground sampling distance (GSD) greater than about 10 cm, the second resolution may comprise a GSD of greater than 1 cm, and the third resolution may comprise a GSD less than 2 mm.

The scouting drone may be equipped with an imaging system and sensors. In an embodiment, the imaging system comprises circuits for hyperspectral imaging, thermal imaging, SAR (synthetic aperture radar) imaging, and day and night thermal imaging. In an embodiment, the sensors comprise accelerometers, gyros, magnetometers, pressure sensors, humidity sensors, gas sensors, temperature sensors, LIDAR and/or RADAR. Depending on the scope of the problem or meaningful development identified by the hotspot imagery subsystem 706, programmed scouting instructions may be generated to control the scouting drone to collect data using any one or more of the imaging system and sensors.

Data may be collected over separate scouting missions, which may occur at different times and/or on different days. The day and time of day of a scouting mission may be selected based on numerous factors including, but not limited to, impact of wind, temperature and inversion frequency on the scouting drone when flown.

Low resolution images from satellite and/or high and medium altitude drones (high-altitude pseudo satellite (HAPS), or medium-altitude long endurance (MALE) unmanned aerial vehicles (UAVs)) and analysis thereof enable focused attention on problematic areas in the field during scouting missions, thereby using resources, such as a scouting drone, more effectively and reducing inefficiencies.

Multiple levels of resolutions may be combined to generate the optimum analysis and recommendation. In an embodiment, collected data may include spatial resolutions extending from greater than 0.5 meter resolution (such as imagery collected by satellite), to moderate level resolution of 5-100 cm resolution (such as collected by aerial platforms, HAPS, or MALE UAVs), to higher resolutions of 0.5 mm-4 cm (such as collected by low-altitude drones), as well as sub-mm imagery collected by on-implement sensors, handheld cameras, stationary cameras, ground-based robotics, or other proximal devices.

In an embodiment, a scouting drone may operate at multiple altitudes during the same flight. For example, large portions of a field may be imaged at a lower resolution (e.g., 4 cm) and select areas of the field may be imaged using the same or different sensor but at a significantly lower altitude, thereby resulting in a much higher resolution image (e.g., sub-mm).

In an embodiment, a first data source may be included in the system for data collected at a resolution greater than 0.5 m, a second data source may be included for data collected at a resolution greater than 2 cm, and a third data source may be included for data collected at less than 1 mm resolution. However, more or less data sources may be utilized to store collected data.

In an embodiment, there may be greater than 10× increase in resolution at each of multiple (e.g., three) layers of data collection. In an embodiment, there is greater than 20× increase in resolution at each of multiple (e.g., three) layers of data collection. In an embodiment, at least one layer of data collection incorporates imagery collected underneath the canopy via drone-based data collection, ground-based robotics, handheld data collection, or stationary devices.

3.2 Data Collection

Images collected by a drone-based platform during scouting missions may include nighttime images and daytime images. Images collected during scouting missions may also include other specialized images such as under canopy images.

Imagery collection by drone(s) may be automatically initiated by data collection and/or analysis based on another source(s), evaluated for suitability of data collection (e.g., lighting, wind speed, weather forecast, etc.). In an embodiment, a multi-level coordination system may be used to automatically initiate the collection of higher resolution imagery based on analysis of lower resolution imagery. In an embodiment, the collection of higher resolution imagery may be designated only in prioritized regions of the field which have been identified by analysis of data from another source and/or previously collected data. Furthermore, in an embodiment, the prioritized regions of the field may include at least some data collected underneath the canopy via drone-based data collection, ground-based robotics, handheld data collection, or stationary devices.

As discussed above, multiple levels of resolutions may be combined to generate the optimum analysis and recommendation. In an embodiments, collected data may include spatial resolutions extending from greater than 0.5 meter resolution (such as imagery collected by satellite), to moderate level resolution of 5-100 cm resolution (such as collected by aerial platforms, HAPS, or MALE UAVs), to higher resolutions of 0.5 mm-4 cm (such as collected by low-altitude drones), as well as sub-mm imagery collected by on-implement sensors, handheld cameras, stationary cameras, ground-based robotics, or other proximal devices. In an embodiment, under-canopy data collection may be accomplished by utilizing drones having enclosed propellers (such as those involving cages or ducted fans), or it may utilize a ground-based robotic system.

Data collection for drone-based imagery may be efficiently accomplished by utilizing on-farm drones, without the need for operator oversight. In an embodiment, a scouting drone may be housed near the field in a "drone-in-a-box" system wherein the scouting drone is housed locally and can be deployed to collected data in an entirely automated system.

Raw data, including drone-collected imagery, from one or more scouting missions, may be subsequently used for prescription development. In an embodiment, the raw data may be received by the server computer subsystem 704. Alternatively, or in addition to, the raw data may be received by the ground station 710 for local or edge processing, thereby freeing computational resources at the server computing subsystem 704. Alternatively, or in addition to, the raw data may be processed by a drone subsystem for local or edge processing, thereby minimizing the need to transfer large volumes of data between systems. Locally processed data may be provided to the server computing subsystem 704 for storage and further processing.

Furthermore, imagery data may be augmented with additional layers of data obtained from a variety of sources, including soil test results, soil type maps, topography, weather, moisture, yield maps, and machine data (e.g., data generated by agricultural machines such as tractors, planters, sprayers, harvesters, and the like). Additional data sources may include field boundaries, farmer practices, agronomic activities, "as-planted" data, "as-applied" data, and/or management zones, and the like.

Regulatory information such as approval status of chemistries, application rates, and dilution rates may also be used as a data source in generating prescriptions. In an embodiment, the regulatory inputs are locally determined given that each jurisdiction may have unique approvals, ordinances, and record-keeping requirements that will inform the application process. Furthermore, the incorporation of regulatory compliance and record keeping is a key requirement for a multi-pass system given that the number of applications may be substantially increased in comparison with traditional practices.

3.3 Prescriptions

The server computer subsystem 704 generates prescriptions based on analysis of various inputs. These inputs may include, but are not limited to, raw data, processed data, efficacy estimate, biomass/yield, economic impact, subjective aggressiveness (e.g., risk tolerance), weed species, pest species, weed size, crop maturity, population density, reapplication options, abiotic stress, active ingredient, modes of action (MOA), and historical data.

In an embodiment, historical data comprises past prescriptions and corresponding prescription results. For example, historical data may comprise past prescriptions and corresponding prescription results, from a previous growing season. For another example, historical data may comprise past prescriptions and corresponding prescription results, from at least two (2) years or more. Current prescriptions and results from the current prescription become part of the historical data and are used as an input for generating the next prescription.

In addition or alternatively, historical data may comprise weed species and density from the previous growing season, insect damage from the previous growing season, disease severity from the previous growing season, soil data from the previous growing seasons, and/or yield information from the previous growing season.

In addition or alternatively, historical data may comprise spatial maps that are derived from imagery data. Spatial maps may be generated using artificial intelligence or machine learning techniques. Example techniques for generating spatial maps are described in U.S. Pat. No. 10,346,958, titled "Methods for Agronomic and Agricultural Monitoring using Unmanned Aerial Systems" and issued Jul. 8, 2019, U.S. application Ser. No. 16/707,168, titled "Mapping Soil Properties with Satellite Data using Machine Learning Approaches" and filed Dec. 8, 2019, U.S. application Ser. No. 16/707,355, titled "Mapping Field Anomalies using Digital Images and Machine Learning Models" and filed Dec. 9, 2019, wherein the entire contents of which are hereby incorporated by reference as if fully set forth herein. A trained machine learning model may generate, from imagery data, output that includes a weed map, a soil map, a lodging map, and/or an inter-row damage map. Other maps of anomalies may also be generated.

Likewise, when involving multiple rounds of treatment, evaluation of previous treatment results may be used to generate a subsequent treatment recommendation and application prescription. For example, if an herbicide of MOA 1 is used for the first application of weed control, an evaluation of the resulting weed population at a later date combined with knowledge of MOA 1 will inform the selection of MOA 2 for a subsequent application, and remaining weeds will inform the selection of subsequent MOA's for an efficient multi-pass treatment system. The use of historical data allows for more precise prescriptions to result in improved, increased crop yields.

Furthermore, historical data may be incorporated into a multi-level coordination system to increase the accuracy of resulting analysis, such as by utilizing synthetic data (e.g., synthetic imagery/data for obscured regions of the field), using data from earlier in the growing season, using data from prior growing seasons, using data from outside the field boundary (e.g., a field managed by the same farmer) and/or using aggregated data from locations not associated with the target field (e.g., using data from other fields/farmers within a region, such as a county level aggregation, or other proximal aggregation), when generating prescriptions. Historical data, such as weed species and density from prior years may be used to prioritize data collection for some regions. For example, prior year data showing resistant weed species in a particular region may be used to prioritize data collection during the current season.

A prescription may be a prescription for an entire field or for a sub-field region (e.g., a zone of a field) and describes a product to apply to the field. The applied product may include agrichemicals such as crop protection chemistry (e.g., herbicides, insecticides, fungicides, fertility treatments (e.g., NPK (nitrogen, phosphorus, potassium) and micronutrients), as well as microbial treatments, and/or soil amendments (e.g., lime), and may also describe a seeding location or density and/or cover crop seeding.

A prescription may be a prescription for a night application. Some agrichemicals and potential agrichemical candidates degrade in sunlight and are otherwise unable to be fully utilized using traditional daylight application methods, or are reduced in efficacy when applied during the day. Furthermore, application of some agrichemicals may show enhanced efficacy when applied at night due to diurnal rhythms of a target plant or pest species such as, for example, applying pesticide at night when the target insect species is most active. In other scenarios, applications during the night may be preferred based on weather patterns such as reduced winds or an absence of inversions which might otherwise lead to application drift.

Different prescriptions may be generated for different applications including, but not limited to, a microbial (fertility) application, an herbicide application, a fungicide application, and an insecticide program.

In an embodiment, a data-based pre-symptomatic/pre-emptive sub-field zone prescription may be generated for treating a zone(s) of the field before symptoms or problems arise. For example, a pre-emergent/residual prescription may be generated for treating a zone(s) of the field to mitigate yield loss due to weed competition. Such a prescription may be generated using data from prior year weed pressure, such as imagery used to determine weed species, location, and density. As an illustration, if in a prior year, a resistant weed was present in a particular zone of the field, then that zone may be treated with a pre-emergent herbicide of a MOA targeted to that weed species and/or a rate determined by an integrated weed management recommendation utilizing species information and location data from the prior year. A pre-emergent/residual prescription may also be generated that includes a variable rate based on prior year data and/or multiple MOA based on prior year data.

For another example, a post-emergent prescription may be generated for treating a zone(s) of the field to control existing weeds. For yet another example, a crop nutrient prescription may be generated for providing nutrients to a zone(s) of the field. For yet another example, a seeding recommendation may be generated for providing hybrid/cultivar and population recommendations. For yet another example, a seeding recommendation may be generated for providing species and population recommendations for seeding a cover crop before harvest of the primary crop. A prescription may be a combination of any of these prescriptions.

In an embodiment, a prescription may incorporate optimization of a flight path given discrete zones of application. Other methods of drone-based application are designed for contiguous application, and are not optimized for discrete sub-field zones. In contrast to these other methods, in an embodiment, a drone flight may be optimized to minimize the flight needed between zones of application and refill requirements. Furthermore, the prescription may be optimized for the size and capabilities of the individual drone (e.g., the width of spray application will impact the geometry of the recommended prescription).

In an embodiment, a prescription may incorporate data from crop plant including hybrids/varieties, population, germplasm, and traits. For example, in a field with a multi-variety or multi-density planting program, the prescription for applications during the season may incorporate information about the germplasm and density across the field. For another example, in higher planting density regions, the likelihood of applying a fungicide may be increased.

In an embodiment, a prescription may incorporate a planting map with trait genetics to make applications of, for example, insecticide more targeted and efficient. There exist refuge guidelines requiring farmers implement refuge areas in their fields. As an example, for insecticidal traits, there are requirements to plant a fraction of a field without those traits as a refuge for some insects to survive without being exposed to the trait, to thereby minimize resistance by ensuring that a portion of the native population always survives. Since refuge seeds do not have the same insecticidal traits, it may be beneficial to treat them with more chemical insecticide (e.g., different from the non-refuge portion of the field).

Programmed application instructions corresponding to the prescription are transmitted from the server computer subsystem 704 to one or more applicable subsystem(s), such as the ground subsystem 712 and/or the drone subsystem 714.

3.4 Reapplication Option

A prescription may also be generated based on optional additional inputs. Optional additional inputs may include the potential to apply agrichemicals in multiple passes. An optimum prescription recommendation may include numerous data sources. In contrast to other practices, an embodiment of this invention may include an option to apply a subsequent application in the analysis of the optimized prescription.

For example, it may be beneficial to apply a fungicide pre-emptively to enhance efficacy. However, in many cases, the return-on-investment (ROI) is not significant if the application occurs in the absence of an outbreak of disease. Thus, farmers often wait until too late to apply fungicide. Incorporating the potential to apply again at a later date increases the responsiveness to risk by allowing for the potential to do a partial treatment in the first application and additional treatments in subsequent applications as an a priori optimization method.

Calculating the ROI of a decision to apply or not to apply a product during the season is usually performed with a heavy emphasis on reducing the number of passes across the field due the inherent cost of application, crop damage, and compaction which are associated with making applications during the season. As such, farmers usually attempt to minimize the number of passes over the field in order to increase their return on investment. In some cases, this results in making applications at less than optimum timing, applying multiple chemistries in the same pass, overapplying or not applying due to the complexity and cost of traditional application systems. Other systems for estimating profitability/ROI for an application do not account for the potential to reapply using the same or different MOA using a drone-based application system which does not incur the crop damage, compaction, and cost incurred by traditional methods. Some embodiments of the current invention include optimization of ROI incorporating the optionality of a reapplying option, including reapplication options involving different sub-field zones and/or different MOA.

The number of passes for a zone may be dependent on different considerations. One example consideration may be the development cycle of the crop at interest. It may be determined to be optimal to apply agrichemicals in multiple passes rather than all at once at the current stage of the development cycle of the crop.

Another example consideration may be the weather. One illustration is a weather responsive nitrogen application. Assume the weather forecast indicates eight (8) wet days in the coming month. It may be determined that it would be optimal to apply agrichemicals multiple times over the next month, each time a day before it rains, rather than all at once. Additional nitrogen is traditionally applied in large doses irrespective of the weather but results in inefficient application, especially in the case of unseasonably wet or dry conditions. In wet conditions, the nitrogen is washed through the soil and results in significant adverse environmental impacts. In dry conditions, the crop is unable to utilize the nitrogen and the excess nitrogen may even create added crop stress. However, by timing application in multiple rounds, the optimum level of nitrogen may be applied in coordination with the rainfall.

In a scenario, fertility treatments may be applied in at least two subsequent post-emergent passes over the field. In another scenario, fertility treatments may be applied in at least three subsequent post-emergent passes over the field. In yet another scenario, fertility treatments may be applied in at least four subsequent post-emergent passes over the field. In yet another scenario, fertility treatments may be applied in at least five or more subsequent post-emergent passes over the field.

In an embodiment, ground-based applications may be combined with drone-based applications of fertility. A portion of the fertility treatments may be applied prior to the season or early in the season (e.g., side-dress application), while subsequent applications of fertility treatments may be applied via drone at a later point in the season. For example, if large amounts of nitrogen are required for a particular field, 75% of the target application may be applied by ground implement prior to emergence (such as, for example, the target amount needed for a dry season), and additional fertility may be applied via drone in 5% increments in coordination with rainfall. If little rainfall is received, such as during a drought year, no additional nitrogen may be applied. If significant rainfall is received, nitrogen may be applied in additional passes coordinated with successive rainfall events and/or predicted weather events. In a scenario, fertility treatments may be applied in at least two subsequent passes over the field, wherein at least one application may be applied via ground-based equipment and at least one pass may be applied via drone in the same season. In another scenario, fertility treatments may be applied in at least three subsequent passes over the field, wherein at least one application may be applied via ground-based equipment and at least two passes may be applied via drone in the same season. In yet another scenario, fertility treatments may be applied in at least four subsequent passes over the field, wherein at least one application may be applied via ground-based equipment and at least three passes are applied via drone in the same season. In yet another scenario, fertility treatments may be applied in at least five or more subsequent passes over the field, wherein at least one application may be applied via ground-based equipment and at least four passes may be applied via drone. In yet another scenario, fertility treatments may be applied in at least five or more subsequent passes over the field, wherein at least two applications may be applied via ground-based equipment and at least one pass may be applied via drone. It is noted that any combination of ground-based applications and drone-based combinations are possible.

Figure 8A:
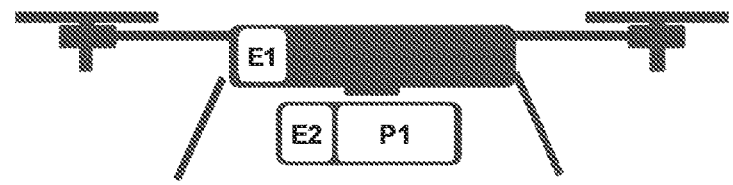
FIG. 8A illustrates an example application drone, in accordance with some embodiments.
Figure 8B:
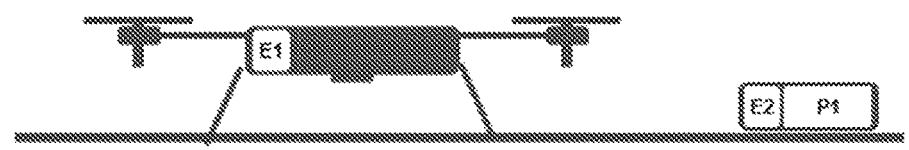
FIG. 8B-FIG. 8H illustrate a graphical usage flow of the application drone of FIG. 8A, in accordance with some embodiments.
Figure 8C:
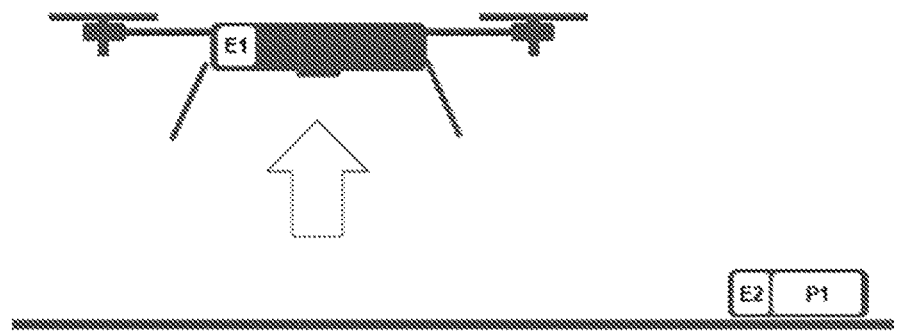
Figure 8D:
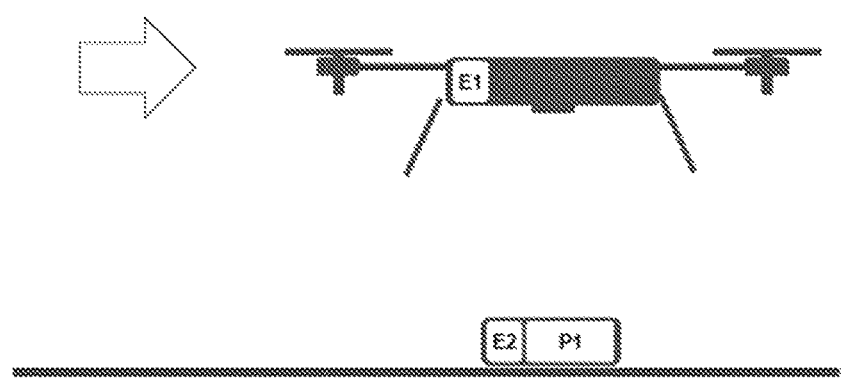
Figure 8E:
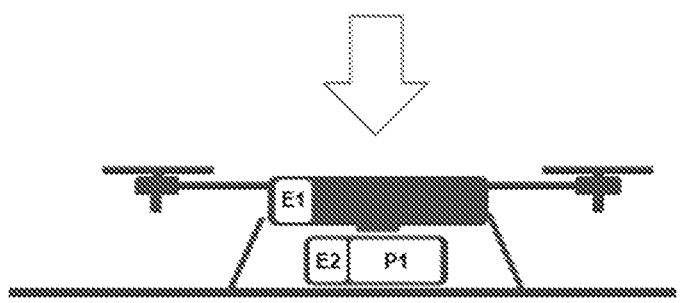
Figure 8F:
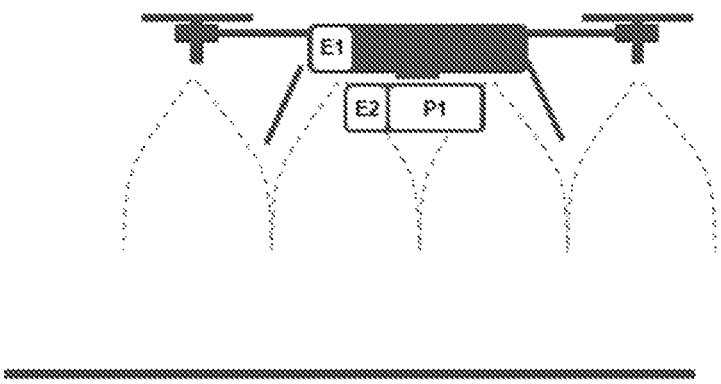
Figure 8G:
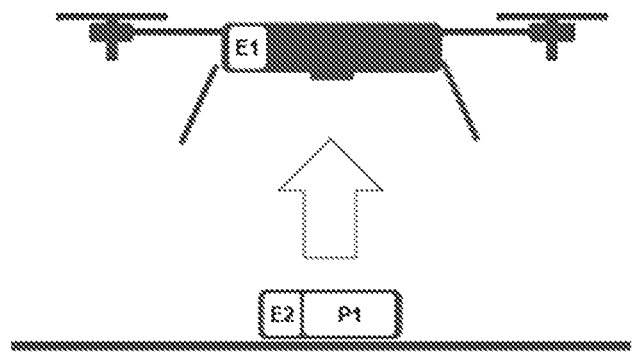
Figure 8H:
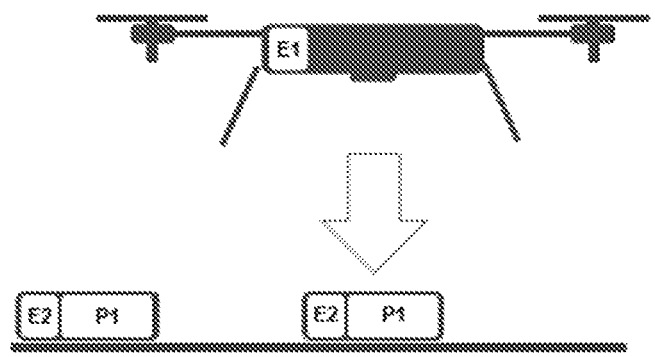

A weather responsive biological application (for example, to combat mycotoxin presence) is another such example, wherein a smaller dose may be applied in one pass, and a subsequent dose(s) may be applied in additional pass(es) as dictated by the weather conditions and developing pest pressure. A weather responsive fungicide application is yet another such example, wherein a smaller dose may be applied in one pass, and a subsequent dose(s) may be applied in additional pass(es) as dictated by the weather conditions and developing pest pressure. A prescription for reapplication may be generated based on these additional inputs.

3.5 Multi-Storage Cartridge Carrying Drone

An application drone may include multiple payload storage cartridges that include different payloads (e.g., agrichemicals such as herbicide or fertilizer) according to a prescription. The multiple payload storage cartridges may be of different sizes and may be swappable. The multiple payload storage cartridges may be coupled with one or more spraying mechanisms, with or without electrostatic nozzles. The application drone, under the control of programmed application instructions, releases the agrichemicals. Unlike its counterpart ground units which require going across the whole field, regardless of whether zones are treated or not, the application drone would only fly over the applicable zone(s) of the field, applying agrichemicals according to the prescription, without human intervention. In an embodiment, the application drone has 25 kg or more payload capacity. In yet another embodiment, the application drone has 50 kg or more payload capacity. In yet another embodiment, the application drone has 100 kg or more payload capacity. In yet another embodiment, the application drone has 200 kg or more payload capacity.

The application drone may use any energy storage mechanism and may also be a "hybrid", using multiple energy storage types. For example, a hybrid drone may utilize both chemical and electrical energy sources for power such as gasoline (chemical) and a supercapacitor (electrical). Example energy sources include as lithium-ion batteries, lithium-air batteries, gasoline, diesel, propane, fuel-cells, super-capacitors, and/or a combination thereof.

In an embodiment, a hybrid powertrain including a hydrocarbon or hydrogen fuel source, may be used to power a generator which outputs electrical energy to drive electrical motors powering the application drone.

The application drone may include a multi-location fuel storage system to provide the ability to refuel without stopping. The multi-location fuel storage system may include an external energy storage location and an internal energy storage location. The external energy storage location may be incorporated into a payload-based energy source to automatically exchange with fresh energy sources upon depletion to provide for continuous operation. The multi-location fuel storage system allows the application drone to operate for an indefinite period of time. For example, the application drone may rely on an internal energy source when an external energy source is unavailable (e.g., empty or not attached). However, when an external energy source is available, the application drone may rely on it as a primary energy source (e.g., during an application of a payload) and/or may use it to replenish the internal energy source (e.g., transfer energy from the external energy source to the internal energy source). The application drone may continuously exchange one external energy source with another. In this manner, the multiple energy sources provide the application drone the ability to operate indefinitely without needing to stop to refuel (e.g., indefinite flight time).

FIG. 8A illustrates an example application drone, in accordance with some embodiments. The application drone 800 is a multi-energy source drone that includes internal location and external location for energy storage. The energy stored in the external storage location may be proportional to the primary payload P1 capacity such that the primary payload P1 to be applied and the capacity of the payload-based energy source E2 are optimized to have approximately equivalent flight durations. For example, a liquid fuel may be stored in the payload-based energy source E2, and liquid agrichemicals may be stored as the primary payload P1. The volume of the payload-based energy source E2 stored is proportional the energy needed by the drone 800 to apply the primary payload P1. Different passes over the field may require different application rates (e.g., gallons per acre applied) which will dictate different optimum relationships between E1 and P1. E2 coupled with P1 is referred to herein as a payload pod or simply as pod.

In an embodiment, on-board energy source E1 and payload-based energy source E2 are of a compatible configuration such that energy can be transferred from E2 to E1 while the application drone is in contact with the payload pod. For example, E1 and E2 may be capable of storing electrical energy, and E2 may transfer energy to E1. For another example, E2 and E1 may be capable of storing hydrogen fuels, and the hydrogen fuel may be transferred from E2 to E1.

Furthermore, in the operation of the dual energy source drone 800, the drone 800 may be returned to be refilled at an interval when the primary payload P1 is depleted. In an embodiment, the payload-based energy source E2 will also be nearly depleted for optimum efficiency. At this point, the drone 800 releases the payload pod but maintains the ability to fly due to the on-board energy source E1. Using the on-board energy source E1, the drone 800 moves to a location of a filled pod containing another volume primary payload P1 and/or an additional payload-based energy source E2.

FIG. 8B-FIG. 8H illustrate a graphical usage flow of the application drone. In FIG. 8B, the application drone, with an on-board energy source E1, is not yet electrically and mechanically coupled with a pod. In FIG. 8C, the application drone relies on E1 for flight. In FIG. 8D, the application drone, using E1, travels to a pod that includes a payload-based energy source E2 and a primary payload P1. In FIG. 8E, the application drone and the pod are aligned and connected. The connection between the application drone and the pod includes mechanical linkages as well as means to transfer energy from E2 to the application drone. In FIG. 8F, the application drone relies on E2 during application of P1. At any point while E2 is electrically and mechanically coupled with the drone, E1 may be replenished from E2. In an embodiment, E2 may be sufficiently sized to enable completion of objective(s) in proportion to the capacity of P1 and the energy requirement of the application drone. The ratio of mass of E2 to P1 may be variable, depending on the objectives (e.g., application rate in kg/acre). In FIG. 8G, the application drone returns after applying P1 and detaches from the pod while under power from E1. In FIG. 8H, the application reattaches to a new pod until mission objectives are completed. As illustrated, the application drone can be refilled with both payload and energy source without the need for operator intervention, significantly increasing the safety and efficiency of drone-based application.

In an embodiment, pods may be refilled using automated means such that manual intervention is not required. Pods may be reused such that as few as two pods are needed to enable a continuous cycle.

In an embodiment, the application drone may operate continuously and autonomously while detaching and reattaching to a new pod (payload and energy). Operational time can thus be extended for an indefinite period of time to meet the needs of any application rate and field size. As such, multiple flights may be accomplished without the application drone ever needing to stop operating. This ability for continuous operation has significant advantages for drones having a fixed payload (for example, drones with a sensor payload), as well as drones having a variable payload (for example, drones intended to apply the payload over an area). In particular, the application drone is capable of multiple continuous flights including durations of indeterminate length which have heretofore been impossible with traditional energy storage mechanisms. Previous attempts at extending flight times including solar (e.g., Airbus HAPS, tethers, and direct electrical conduction) have significant limitations which preclude the operation in a manner described herein primarily due to limitations on the ability to exchange energy sources during flight and/or inability to fly over long distances.

In an embodiment, each pod used during a particular mission may be outfitted with differing amounts of E2 and P1, as well as differing ratios of E2 and P1. In an embodiment, the payload may be a different function or MOA on successive cycles. For example, an herbicide with a Group 9 MOA may be used for one cycle, and an herbicide with Group 4 MOA may be used in a successive cycle.

For another example, a function of a payload may also be different. As an illustration, one pod may contain a sensor package (e.g., multi-spectral imagery, thermal imagery, hyperspectral) rather than an energy source.

In an embodiment, primary payload P1 may be subdivided such that the drone comprises more than one agrichemical product for application such as, for example, two different modes of action of herbicide, or an herbicide and a fungicide.

In an embodiment, multiple application drones may be flown in parallel, with each application drone including the same or different payloads, to cover different zones of a field or to cover one or more fields.

3.6 Crop Protection with Multiple Passes

Some farming practices, involving ground implements, include a total of less than three passes across a field between planting operations and harvesting operations: one or two passes for an herbicide program, and one pass for a fungicide program. The system 700 of FIG. 7 shifts to a different, new paradigm where the number of passes across the field, between planting operations and harvesting operations, is not a limiting factor, because drones, unlike ground implements, do not cause soil compaction and crop damage and have the ability to apply agrichemicals over wet fields. Using one or more scouting drones and one or more application drones, 10, 20, 30 or even more passes across a field may occur during a season. Drones may be utilized any time and as frequently as needed to obtain data and to apply agrichemicals, based on precise prescriptions, when and where it is needed.

Zones may be relatively large contiguous portions of a field, such as 25-50% of the field, or may be smaller contiguous regions that are 1-10% of the field, or may be even micro-zones that less than 1% of the field, including treatments intended for a single-plant zone. Importantly, the zones may be different sizes and shapes for each application, including successive passes to apply the same category of compounds. For example, multiple applications of herbicide may result in different zones in each pass, as well as different MOA for each pass. Furthermore, since some of these passes may cover substantially smaller fractions of the field, the opportunity to utilize novel chemistries is expanded (e.g., chemistries that would otherwise be too expensive for broad-acre application). For example, a first pass of a category of product (e.g., herbicide) applies a product to at least 80% of the field, a second pass applies a product to less than 80% of the field, a third pass applies a product to less than 50% of the field, and a fourth pass applies a product to less than 20% of a field.

In a scenario, an herbicide program may incorporate multiple passes each season, including four or even more passes, each of the passes may be for different sub-field zones within the field, and may cover only a fraction of the total area or may use a different rate for different sub-field zones. For example, during a first pass, agrichemicals may be applied to larger zones, and during each subsequent pass, agrichemicals may be applied to decreasingly smaller areas for more specific targeting. For example, the initial pass may cover nearly the entire field with a broad spectrum weed control agent, while subsequent passes cover less of the field with MOA targeted to the weeds that have not been entirely controlled by the first pass and/or emerged after the first pass. An additional pass may be targeted to specific resistant weeds (e.g., resistant pigweed) with the optimum MOA, and another pass may be targeted to volunteer crops (e.g., corn within a soybean field, both of which are glyphosate tolerant) with a MOA optimized for volunteer control.

In an embodiment, the ability to coordinate between multi-level data sources allows significant precision in targeting and applying crop protection chemistry. For example, resistant weeds and/or volunteers can be targeted at the single-plant level, which has thus far not been a capability associated with drone-based platforms (e.g., limited to ground-based platforms).

A similar strategy may be used for other programs of applications including, but not limited to, fungicide, insecticide, fertility, growth regulators, defoliants, and RNAi. The entire system may result in substantially increased number of passes over the field during the season. In an embodiment, a field may have data collected X times and applications made Y times, where both X and Y are positive integers greater than two.

As discussed herein, applications may be coordinated with environmental developments throughout the season, including weather and weather forecasts, crop development, pest pressures, disease pressure, and aggregated proximal data. For example, nitrogen is best applied to plants when it rains. An application drone could put down nitrogen the day before it rains, as compared to traditional practices where nitrogen is applied once during the season. Although nitrogen can be reapplied by a ground implement, the ground implement would cause more physical damage to the field than the gained potential benefit, resulting in economic damage.

Furthermore, applications may be coordinated with the development stage of the crop and/or the localized developmental stage of the crop. In certain situations, particularly in large fields, sub-field zones of the field may experience differences in developmental maturity even though the crop may have been planted at the same date. Likewise, some fields are intentionally planted with multiple hybrids/varieties to optimize production, but these varieties may have slightly different maturities. Embodiments of multi-pass optimization enable the targeting of zones within the field based on localized developmental maturity detected through imagery analytics.

Advantages of the current invention include the ability to respond to environmental developments at a rapid rate, without waiting for the field to dry. For example, using current ground-based application methods, significant rainfall would preclude application for at least several days after rainfall. Furthermore, current aerial application techniques are capable of applying over wet fields but are not capable of high resolution sub-field zoned applications. However, using a drone-based application system of the present invention enables rapid responsiveness even after rainfall and maintains the high precision desired for targeted subfield applications.

Applications may also be tied to periodic (e.g., daily, weekly, monthly, etc.) or as needed retrieval of satellite and drone images. For example, new images may show a new pest problem or may show an improvement to a problem. An application drone could apply agrichemicals in an ad-hoc manner, according to current situations in the field, for more responsive interventions.

The resulting combination of high-frequency image-based data collection and the ability to apply at a high frequency throughout the season using drone-based application techniques is an environmentally responsive production method with improved efficiency in comparison to traditional methods. Furthermore, decreased environmental impact and increased sustainability and will result from responsive applications targeted to the specific need at the right time.

The following are examples of a season-long agronomic system with multi-pass optimization illustrating a subset of the embodiments described herein.

3.6.1 Herbicide Example

Prior to planting, field boundaries, imagery, soil type zones, weed species and density maps, and regulatory compliance may be used to recommend the optimum MOA and develop a prescription for a variable rate application of herbicide for burndown. A drone may be used to apply herbicide over the entire field in accordance with the herbicide prescription.

Prior to planting, a residual may be applied. In developing the residual prescription, field boundaries, imagery, soil type zones, historical weed pressure information, and regulatory compliance may be used to recommend the optimum MOA and develop a variable rate application of herbicide for residual application. The herbicide may be applied in zones including some areas wherein no herbicide is applied.

Post emergence, additional herbicide may be applied. The herbicide may be selected from a group that the crop exhibits tolerance to—either through naturally selectivity of the herbicide to that species or through genetic modification of the crop (e.g., glyphosate resistant crops). In developing this prescription, field boundaries, imagery, soil type zones, historical weed pressure information, weed maps of species and size, and regulatory compliance may be used to recommend the optimum MOA and develop a variable rate application of herbicide for residual application. The herbicide may be applied in zones including some areas wherein no herbicide is applied. The herbicide applied in this pass may cover less area than the preceding application.

A third herbicide pass may be applied. The herbicide may be selected from a group that the crop exhibits tolerance to—either through naturally selectivity of the herbicide to that species or through genetic modification of the crop (e.g., glyphosate resistant crops). In developing this prescription, field boundaries, imagery, soil type zones, historical weed pressure information, weed maps of species and size, and regulatory compliance may be used to recommend the optimum MOA and develop a variable rate application of herbicide for residual application. The herbicide may be applied in zones including some areas wherein no herbicide is applied. Preferably, the herbicide applied in this pass covers less area than the preceding application. As an example, this pass may focus specifically on weeds which exhibit resistance to the MOA used in a previous pass, and comprises a MOA not previously used in this season (for the purposes of resistance management).

A fourth herbicide pass may be applied. The herbicide may be selected from a group that the crop exhibits tolerance to—either through naturally selectivity of the herbicide to that species or through genetic modification of the crop (e.g., glyphosate resistant crops). In developing this prescription, field boundaries, imagery, soil type zones, historical weed pressure information, weed maps of species and size, and regulatory compliance may be used to recommend the optimum MOA and develop a variable rate application of herbicide for residual application. The herbicide may be applied in zones including some areas wherein no herbicide is applied. Preferably, the herbicide applied in this pass covers less area than the preceding application. As an example, this pass may focus specifically on weeds which exhibit resistance to the MOA used in a previous pass, and comprises a MOA not previously used in this season (for the purposes of resistance management).

A fifth herbicide pass may be applied wherein an herbicide is selected from a group that the crop exhibits tolerance to—either through naturally selectivity of the herbicide to that species or through genetic modification of the crop (e.g., glyphosate resistant crops). In developing this prescription, field boundaries, imagery, soil type zones, historical weed pressure information, weed maps of species and size, and regulatory compliance may be used to recommend the optimum MOA and develop a variable rate application of herbicide for residual application. The herbicide may be applied in zones including some areas wherein no herbicide is applied. Preferably, the herbicide applied in this pass covers less area than the preceding application. As an example, this pass may focus specifically on volunteers which exhibit tolerances to MOA previously used (e.g., volunteer glyphosate-tolerance corn in a glyphosate-tolerance soybean field).

A sixth herbicide pass may be applied in regions of the field that exhibit unusual levels of weed infestations such as, for example, in zones which have been affected by ponding earlier in the season. In developing this prescription, field boundaries, imagery, soil type zones, historical weed pressure information, weed maps of species and size, and regulatory compliance may be used to recommend the optimum MOA and develop a variable rate application of herbicide for residual application, wherein the herbicide may be applied in zones including some areas wherein no herbicide is applied.

After each herbicide application, imagery (e.g., satellite or drone) may be used to evaluate the efficacy of the herbicide and identify uncontrol weeds for future application. In an embodiment, imagery may be collected at multiple resolutions to inform the analysis. In an embodiment, imagery may be collected at least three resolutions to inform the analysis. Lower resolution imagery may be used to determine weed pressure and initiate scouting at a higher resolution. Medium resolution imagery may be used to identify specific weeds of interest, and higher resolution imagery may be used to determine individual weed species and size. When the density of weeds reaches a scale at which the ROI of an additional herbicide application is positive, a recommendation may be provided to farmer.

In arriving at each of these herbicide recommendations, the risk of weed emergence may be balanced with the option to reapply herbicide (with the same or different MOA) at a later date, and the overall intent of maximizing the efficacy of the weed control program, minimizing the potential for weed resistance, minimizing the environmental impact, and/or maximizing the farmer's ROI.

3.6.2 Insecticide Example

In an embodiment, insecticide may be applied in multiple passes during the season. Prior to application, imagery may be collected at multiple resolutions to inform the recommendation to apply. Imagery may be collected at at least three resolutions to inform the analysis. Lower resolution imagery may be used to determine underperforming regions of the field and initiate scouting at a higher resolution. Medium resolution imagery may be used to identify regions of interest. Higher resolution imagery may be used to determine insect impact to individual plants (e.g., by measuring insect density or leaf area). When the insect density or damage reaches a scale at which the ROI of an additional insecticide application is positive, a recommendation may be provided to farmer.

In an embodiment, insecticide may be applied to regions of the field comprising less than the entire field. In an embodiment, data sourced from regions outside the field may be used to inform the recommendation (e.g., regionally sourced information such as the presents of pests on other fields on the same farm, fields from other farmers, and regional aggregates). Furthermore, weather-based risk models may be used to inform the decision to apply an insecticide pass.

Additional passes for insecticide application may be made, with an insecticide comprising a different MOA from previous applications in an embodiment. Furthermore, each pass may apply insecticide to different regions of the field, depending on the current pest pressure, efficacy of previous insecticide applications, predicted weather, ability to reapply in a subsequent pass, and/or the risk aversion of the farmer (among other inputs).

In arriving at each of these insecticide recommendations, the risk of insect damage may be balanced with the option to reapply insecticide (with the same or different MOA) at a later date, and the overall intent of maximizing the efficacy of the insect control program, minimizing the potential for insect resistance, minimizing the environmental impact, and/or maximizing the farmer's ROI.

3.6.3 Fungicide Example

In an embodiment, fungicide may be applied in multiple passes during the season. Prior to application, imagery may be collected at multiple resolutions to inform the recommendation to apply. In an embodiment, imagery may be collected at at least three resolutions to inform the analysis. Lower resolution imagery may be used to determine underperforming regions of the field which may be at risk of disease infestation and initiate scouting at a higher resolution. Medium resolution imagery may be used to identify specific regions of interest. Higher resolution imagery may be used to determine disease types and severity (for example, by image recognition combined with edge-processing to develop a diagnosis). In an embodiment, imagery may be collected from underneath the canopy, such as by a drone or ground-based robot, and may be used to diagnose the presence of disease (e.g., fungal stalk diseases, such as stalk rots). When the density of disease pressure reaches a scale at which the ROI of a fungicide application is positive, a recommendation is provided to farmer.

In an embodiment, fungicide may be applied to zones of the field comprising less than the entire field. In an embodiment, these sub-field zones may be determined by estimating a local ROI for application in each region (e.g., using biomass estimates obtained from imagery, projected yield of the crop, and projected yield impact of a fungicide application). In an embodiment, data sourced from regions outside the field may be used to inform the recommendation (e.g., regionally sourced information such as the presents of disease on other fields on the same farm, fields from other farmers, and regional aggregates). Furthermore, weather-based risk models may be used to inform the decision to apply a fungicide.

Additional passes for fungicide application may be made, with a fungicide comprising a different MOA from previous applications. Furthermore, each pass may apply fungicide to different regions of the field, depending on the current pest pressure, efficacy of previous fungicide applications, predicted weather, ability to reapply in a subsequent pass, and/or the risk aversion of the farmer (among other inputs).

In arriving at each of these insecticide recommendations, the risk of disease may be balanced with the option to reapply fungicide (with the same or different MOA) at a later date, the overall intent of maximizing the efficacy of the disease control program, minimizing the potential for disease resistance, minimizing the environmental impact, and/or maximizing the farmer's ROI.

3.6.4 Fertility Example

In an embodiment, ground-based fertilizer applications may be combined with drone-based applications of fertility.

A portion of the fertility treatments may be applied prior to planting based on historical yield data, soil test information, soil type, estimated nitrogen deficits, the crop species to be planted (including multi-variety/hybrid zones), population density (including variable density), and the hybrid/variety response to nitrogen. In this example, 75% of the optimum nitrogen target may be applied by ground implement prior to emergence (such as, for example, the target amount estimated to be needed for a very dry season).

As the season progresses, a weather-responsive fertility plan may be developed based on actual and forecast weather events, the development of the crop, and/or analysis of imagery from field(s). Recommendations may be generated to apply additional nitrogen fertilizer via drone in 5% increments in coordination with rainfall. The day prior to a predicted rainfall event, nitrogen fertilizer may be applied. Further estimations of the nitrogen requirements and/or deficient in the field progress may be based on ongoing weather events, imagery analysis of the field, and/or development of the crop. A third pass of nitrogen may be applied and coordinated with a predicted rainfall event. Additional passes (e.g., fourth pass, fifth pass, etc.) of nitrogen may be applied in coordination with a predicted rainfall event.

Furthermore, high resolution imagery obtained by drones may be used to diagnose other fertility deficiencies such as micronutrient deficiency (e.g., iron deficiency chlorosis in soybean, zinc/sulfur/manganese deficiencies in corn) throughout the season. As micronutrient deficiencies may show up late in the season, they are frequently not corrected due to the cost of making an additional late-season pass and/or the negative yield impact associated with crop damage from the equipment. However, using drone-based application, micronutrients may be targeted specifically to the sub-field zones needing treatment based on the optimum ROI and ability to re-apply if needed.

3.6.5 Microbials Example

In an embodiment, microbials may be applied via drone-based application. Microbial products (e.g., bacterial or fungal organisms) may be applied for a variety of purposes including fungicidal effects. In an embodiment, weather-based models may be used to predict the severity of mycotoxins (e.g., wet, hot conditions), and are treated via a microbial preventative product (e.g., Afla-Guard from Syngenta, containing a nontoxigenic strain of *A. flavus*).

3.6.6 Cover Crops Example

In an embodiment, cover crops may be seeded into the field before harvest of the primary crop. Historical data, soil type information, soil test results, weather data, soil moisture, and/or topography may be used to create a variable species recommendation for seeding the field with two different species of cover crop, using two successive passes over the field (e.g., a different species in each pass). Furthermore, the density of seeding may also be variable based on the needs of the individual field.

3.6.7 PGR

Depending on the crop, additional passes may be utilized to optimize the yield and/or ROI for farmer. For example, plant growth regulators (PGR) are frequently used in some crops. Likewise, defoliants are often used to increase the harvestability (e.g., in cotton).

Throughout the season, imagery may be collected regularly including pre-planting all the way through harvest, including imagery of bare soil post-harvest, and imagery of cover crop growth. Imagery may be collected on a daily frequency by satellite, including multiple different satellites coordinated for imagery collection. Multiple different satellite types may be used for data collection (e.g., multi-spectral, hyperspectral, and SAR). In an embodiment, drone-based imagery may be collected on an approximately weekly basis across the entire season, depending on the weather, progress/issues identified from satellite imagery, and/or timing of applications mentioned above. Drone-based imaging may be scheduled based on a project timeframe of impact for a previous treatment to evaluate the efficacy of that treatment. Drone-based imagery may be collected using on-farm drones, without the need for manual oversight. Edge-processing may be used to reduce the data load for further upload and processing such that results from imagery analytics are used as inputs to recommendations without all data collected being transferred to the remote computer systems.

3.7 Procedural Overview

FIG. 9 illustrates an example method of generating a prescription for reapplication, in accordance with some embodiments. Method 900 includes operations, functions, and/or actions as illustrated by blocks 902-910. For purposes of illustrating a clear example, the method of FIG. 9 is described herein with reference to execution using certain elements of FIG. 7; however, FIG. 9 may be implemented in other embodiments using computing devices, programs, or other computing elements different than those of FIG. 7. Further, although the blocks 902-910 are illustrated in order, the blocks may also be performed in parallel, and/or in a different order than described herein. The method 900 may also include additional or fewer blocks, as needed or desired. For example, the blocks 902-910 can be combined into fewer blocks, divided into additional blocks, and/or removed based upon a desired implementation.

FIG. 9 may be implemented using one or more computer programs or other software elements organized as sequences of instructions stored on computer-readable storage media. FIG. 9, and each other flow diagram or other process description in this disclosure, is described at the same level of detail as ordinarily used by persons of skill in the computing arts to communicate among one another about the functional steps to be realized in computer programs that may include far more methods, objects, subroutines, or instructions than specifically indicated in FIG. 9; the development, deployment, testing and debugging of functional programs is deemed to be within the high level of skill in the art to which this disclosure pertains.

In addition, each block 902-910 may represent a module, a segment, or a portion of program code that includes one or more instructions executable by a processor for implementing specific logical functions or operations. The program code may be stored on any type of computer-readable medium or storage device including a disk or hard drive, for example. The computer-readable medium may include a non-transitory computer-readable medium, such as computer-readable media that stores data for short periods of time like register memory, processor cache, and Random Access Memory (RAM). The computer-readable medium may also include non-transitory media, such as secondary or persistent long term storage, like read only memory (ROM), optical or magnetic disks, compact-disc read only memory (CD-ROM), etc. The computer-readable medium may also include any other volatile or non-volatile storage systems. The computer-readable medium may be considered a computer-readable storage medium, for example, or a tangible storage device. In addition, one or more of blocks 902-910 may represent circuitry that is configured to perform the logical functions and operations of method 900.

The method 900 begins at step 902, a first set of data is received from a hotspot imagery subsystem. In one embodiment, the hotspot imagery subsystem comprises a satellite or a high altitude drone. The hotspot imagery subsystem captures low resolution images of an agricultural field. A server computer subsystem may receive the low resolution images on a periodic basis or on an ad-hoc bases.

At step 904, when the first set of data indicates a meaningful development in the agricultural field, a set of diagnostic instructions is generated based on the first set of data. In one embodiment, the server computer subsystem generates the set of diagnostic instructions according to an analysis of the problem indicated by the low resolution images. The set of diagnostic instructions is uploaded to a scouting drone prior to a scouting mission and instructs the scouting drone where to fly and what data to collect. For example, when the low resolution images indicate a pest problem in a zone of the corn field, the set of diagnostic instructions is generated and controls the scouting drone during a scouting mission to investigate the pest problem.

At step 906, using the set of diagnostic instructions, a diagnostic scouting subsystem is remotely controlled on a scouting mission to obtain a second set of data. In one embodiment, the diagnostic scouting subsystem includes the scouting drone that has been previously uploaded with the set of diagnostic instructions. Continuing with the example, the set of diagnostic instructions may control the scouting drone during the scouting mission to fly under the corn canopies to collect field-level data. The field-level data may be collected by onboard imaging system and sensors of the scouting drone. Example field-level data include images of diagnostic resolution.

At step 908, using the second set of data, a field prescription of reapplication is generated. The field prescription is associated with a set of application instructions. In one embodiment, the server computer subsystem generates the field prescription and the set of application instructions. The field prescription may be generated based on analysis of the field-level data and on other various inputs including weather, number of passes, and historical data. The number of passes may be dependent on weather forecast. In one embodiment, historical data includes past prescriptions and corresponding prescription results. The set of application instructions for the field prescription is uploaded to an application drone prior to an initial application mission and instructs the application drone where to fly and what agrichemicals to apply.

At step 910, using the set of application instructions, a drone subsystem is remotely controlled on a plurality of application missions. In one embodiment, the drone subsystem includes the application drone that has been previously uploaded with the set of application instructions. During each application mission, the drone subsystem, including the application drone, is remotely controlled to pass over a portion of the agricultural field and to apply agrichemicals to the portion of the agricultural field according to the field prescription. Continuing with the example, the set of application instructions may control the application drone to, during a first pass, to apply agrichemicals to the corn zone, and during each subsequent pass, to apply agrichemicals to decreasingly smaller areas for more specific targeting.

The approaches disclosed herein provide for a paradigm shift, from where the number of passes across an agricultural field was a limiting factor to where passes across an agricultural field may be optimized to the environmental developments during the season using as many passes across the field as needed. Using drones, interactions with the field may be much more frequent without inherent limitations of ground implements and, thereby, enable extraordinary levels of in-season optimization and risk aversion. Agrichemicals may be applied in an ad-hoc manner, according to current situations in the field, for more responsive interventions.

4 Other Aspects of Disclosure

In the foregoing specification, embodiments of the invention have been described with reference to numerous specific details that may vary from implementation to implementation. Thus, the sole and exclusive indicator of what is the invention and, is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A system for controlling application of agrochemical products, comprising:
    an application drone comprising an internal energy source; and
    at least one payload storage cartridge capable of coupling to the application drone, the at least one payload storage cartridge comprising:
        a primary payload storage storing an agrochemical payload; and
        a payload-based energy source, wherein energy is transferrable from the payload-based energy source to the internal energy source while the application drone is coupled to the at least one payload storage cartridge, and wherein the payload-based energy source stores an amount of energy proportional to the agrochemical payload.

2. The system of claim 1, wherein each of the internal energy source and the payload-based energy source independently comprise a lithium-ion battery, a lithium-air battery, gasoline, diesel, propane, a fuel-cell, hydrogen, a super-capacitor, or combinations thereof.

3. The system of claim 1, wherein the energy stored in the payload-based energy source is approximately an amount required for the application drone to apply the agrochemical payload over an application zone.

4. The system of claim 1, wherein the application drone depletes the internal energy source when uncoupled to the payload storage cartridge and wherein the internal energy source is replenished by the payload-based energy source when the application drone is coupled to the payload storage cartridge.

5. The system of claim 1, wherein the application drone uses the internal energy source when uncoupled to the payload storage cartridge and is powered directly with the payload-based energy source when the application drone is coupled to the payload storage cartridge.

6. The system of claim 1, wherein the at least one payload storage cartridge is a plurality of payload storage cartridges, wherein each of the plurality of storage cartridges are individually coupled to the application drone according to an application sequence.

7. The system of claim 6, wherein the application drone is configured to operate continuously by coupling and recoupling to each of the plurality of storage cartridges.

8. The system of claim 1, wherein the primary payload storage is subdivided to accommodate a plurality of agrochemical payloads.

9. The system of claim 1, wherein the application drone has between 25 kg and 100 kg of agrochemical payload capacity.

10. The system of claim 1, wherein the application drone has between 100 kg and 200 kg of agrochemical payload capacity.

11. A method for controlling application of agrochemical products, comprising:
providing an application drone comprising an internal energy source;
providing at least one payload storage cartridge capable of coupling to the application drone, the at least one payload storage cartridge comprising:
a primary payload storage storing an agrochemical payload; and
a payload-based energy source, wherein energy is transferrable from the payload-based energy source to the internal energy source while the application drone is coupled to the at least one payload storage cartridge, and wherein the payload-based energy source stores an amount of energy proportional to the agrochemical payload;
coupling the application drone to the at least one payload storage cartridge;
receiving, by the application drone, application instructions indicating an application zone; and
applying the agrochemical payload over the application zone.

12. The method of claim 11, wherein each of the internal energy source and the payload-based energy source independently comprise a lithium-ion battery, a lithium-air battery, gasoline, diesel, propane, a fuel-cell, hydrogen, a super-capacitor, or combinations thereof.

13. The method of claim 12, wherein the energy stored in the payload-based energy source is approximately an amount required for the application drone to apply the agrochemical payload over the application zone.

14. The method of claim 11, wherein the application drone depletes the internal energy source when uncoupled to the payload storage cartridge and wherein the internal energy source is replenished by the payload-based energy source when the application drone is coupled to the payload storage cartridge.

15. The method of claim 12, wherein the application drone uses the internal energy source when uncoupled to the payload storage cartridge and is powered directly with the payload-based energy source when the application drone is coupled to the payload storage cartridge.

16. The method of claim 11, wherein the at least one payload storage cartridge is a plurality of payload storage cartridges, wherein the method further comprises receiving, by the application drone, an application sequence, wherein each of the plurality of storage cartridges are individually coupled to the application drone according to the application sequence.

17. The method of claim 16, wherein the application drone is configured to operate continuously by coupling and recoupling to each of the plurality of storage cartridges.

18. The method of claim 11, wherein the primary payload storage is subdivided to accommodate a plurality of agrochemical payloads.

19. The method of claim 11, wherein the application drone has between 25 kg and 100 kg of agrochemical payload capacity.

20. The method of claim 11, wherein the application drone has between 100 kg and 200 kg of agrochemical payload capacity.

* * * * *